US006748472B2

(12) United States Patent
Knudsen

(10) Patent No.: US 6,748,472 B2
(45) Date of Patent: Jun. 8, 2004

(54) METHOD AND SYSTEM FOR AN INTERRUPT ACCELERATOR THAT REDUCES THE NUMBER OF INTERRUPTS FOR A DIGITAL SIGNAL PROCESSOR

(75) Inventor: Carl J. Knudsen, Gilbert, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 527 days.

(21) Appl. No.: 09/796,271

(22) Filed: Feb. 28, 2001

(65) Prior Publication Data

US 2002/0120802 A1 Aug. 29, 2002

(51) Int. Cl.⁷ .......................... G06F 13/10; G06F 9/48; H04B 1/00
(52) U.S. Cl. ..................... 710/260; 712/35; 381/2
(58) Field of Search .................. 710/260, 62, 240, 710/72, 310, 48, 305, 31, 52; 712/35; 713/502; 709/217; 361/686; 381/2

(56) References Cited

U.S. PATENT DOCUMENTS 5,122,735 A * 6/1992 Porter et al.
5,717,932 A   2/1998 Szczepanek et al.
5,987,556 A * 11/1999 Nakagawa et al.
6,049,565 A *  4/2000 Paradine et al.
6,154,803 A   11/2000 Pontius et al. ............... 710/128
6,157,976 A   12/2000 Tien et al. .................. 710/129

OTHER PUBLICATIONS

Philips Electronics North American Corp., *ThunderBird Avenger PCI Audio Accelerator Data Sheet*, Preliminary specification Nov. 12, 1999.
Royal Philips Electronics, *SAA7780 ThunderBird Q3D PCI 3D Audio Accelerator*, International Marketing Sales Communicatons Nov. 99.

* cited by examiner

Primary Examiner—Gopal C. Ray
(74) Attorney, Agent, or Firm—Michael J. Ure

(57) ABSTRACT

A circuit arrangement reduces the number of interrupts to a DSP required to transfer digital samples between external I/O devices and a data memory, thus allowing the DSP to perform additional sample processing operations. An interrupt accelerator responds to I/O interrupts from an I/O device by pausing the DSP, transferring samples with the data memory, and tracking the number of samples transferred. When a predetermined number of samples have been transferred, the interrupt accelerator interrupts the DSP to perform a block transfer of samples in conjunction with sample processing.

21 Claims, 3 Drawing Sheets

METHOD AND SYSTEM FOR AN INTERRUPT ACCELERATOR THAT REDUCES THE NUMBER OF INTERRUPTS FOR A DIGITAL SIGNAL PROCESSOR

FIELD OF THE INVENTION

The invention is generally related to digital signal processor (DSP) circuit arrangements and integrated circuits incorporating the same and, in particular, to a DSP configured for sample processing for a plurality of recording and play back devices.

BACKGROUND OF THE INVENTION

As semiconductor fabrication technology advances, designers of integrated circuits are able to integrate more and more functions into a single integrated circuit device, or chip. As such, electronic designs that once required several integrated circuits electrically coupled to one another on a circuit board or module may now be integrated into a single integrated circuit, thereby increasing performance and reducing cost.

One function that has migrated from discrete circuits to integrated circuits is digital signal processing, which is generally the application of mathematical operations to digitally represented signals. Digital signal processing is utilized in a number of applications, such as to implement filters for audio and/or video signals, to decode information from communication signals such as in wireless or other cellular networks, etc.

Semiconductor fabrication technology has advanced to the point where the logic circuitry that carries out digital signal processing may be carried out by dedicated digital signal processors that execute software programs, referred to herein as DSP programs, to implement specialized DSP algorithms. Moreover, digital signal processors may be embedded in integrated circuits, or chips, with additional logic circuitry to further provide improvements in performance while lowering costs.

The ability to program a DSP provides great flexibility. For example, a DSP may form the processing engine for an audio controller used in a home theater system, console video gaming system, or a music entertainment system. The audio controller generally performs a number of functions for a host controller. For example, the audio controller interfaces with a number of external input and output (I/O) devices that provide or receive digital audio samples. The DSP may further perform sound processing of the samples, providing effects such as music synthesis, rendering three dimensional positioning of sound, conversion between sound formats, and other functions.

Typically, the DSP interconnects with various types of external I/O devices via a DSP bus to which the various I/O devices are interfaced. These I/O devices provide samples or request samples by "interrupting" the DSP, wherein an interrupt is a hardware or software signal that temporarily stops program execution in a computer so that another procedure can be carried out. In particular, another portion of DSP instructions may be performed that handle interrupts. Thus, upon receiving an interrupt, the DSP typically has to save its current state and execute interrupt program code to perform the sample transfer before being able to return to its previous operation. The overhead associated with handling an interrupt with a DSP can be substantial, e.g., 30 to 50 clock cycles or more, so any time a DSP is diverted to handling interrupts, the DSP's ability to perform its primary signal processing tasks is diminished.

In audio controller applications, a DSP has traditionally had to handle an interrupt every time that an external I/O devices needs two 16-bit words (stereo audio pair) of data between data memory and audio I/O registers. External audio I/O devices typically operate at sample rates from 8 to 48 kHz. Conventional DSP designs that are configured to handle three input and three output external I/O devices have been found to require approximately 288,000 interrupts per second. Handling this number of interrupts with a DSP typically requires 9–14 million instructions per second (MIPS), which is a significant portion of the available processing time for a DSP.

In some applications, audio controllers increase the operating speed of the DSP several-fold in order to handle the interrupts while providing high performance sound processing and multi-function capability. However, the higher operating speed increases the cost and complexity of the DSP. In other applications, additional I/O register buffers are used to interface the audio controller to the external I/O devices. However, the registers also increase the cost and number of external connections for the audio controller.

Therefore, a significant need continues to exist in the art for a manner in a digital signal processing environment of decreasing the overhead processing of handling DSP interrupts from external I/O devices.

SUMMARY OF THE INVENTION

The invention addresses these and other problems associated with the prior art by providing a circuit arrangement that uses an interrupt accelerator to reduce the number of interrupts to a DSP. The interrupt accelerator principally handles transfers between a data memory and an I/O interface without having to interrupt the DSP for each transfer, as in conventional designs. As a result, the DSP needs to be interrupted only after blocks of data have been transferred. By reducing the number of interrupts to the DSP with an interrupt accelerator, the DSP has reduced overhead and thus more available bandwidth for performing other DSP operations.

Consistent with one aspect of the invention, an interrupt accelerator responds to an I/O interrupt from an I/O interface by transferring samples with the data memory. When a predetermined number, or block, of samples has been transferred, the interrupt accelerator interrupts the DSP so that the DSP will handle the block of samples.

These and other advantages and features which characterize the invention are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The herein described embodiments utilize an interrupt accelerator in a digital signal processing environment to transfer digital signal data samples between an I/O device and a data memory accessed by a DSP. The interrupt accelerator tracks the number of samples transferred, interrupting the DSP when a predetermined number of samples, or block, has been transferred to or from the data memory. In response, the DSP performs signal processing operations with the block of samples or transfers processed samples to replace a block that has been output.

The use of interrupts to communicate with the DSP provides a flexible architecture, allowing various numbers and types of interfaces to communicate with the DSP. As an illustration, audio controllers often interface to devices that communicate in Sony/Philips Digital Interface Format ("S/P DIF"), such as a Digital Video Disk (DVD) player. Other devices communicate in Inter-IC-Sound ("$I^2S$") serial format, such as compact disk players and recorders. Yet others use an Audio CODEC '97 (AC97) specification format, such as an audio CODEC (coder-decoder) interfaced to analog devices such as microphones and speakers.

Typically, the audio controller includes an I/O interface coupled to at least one external I/O device and to a DSP bus. The I/O interface transfers samples between an external I/O device and an assigned I/O register coupled to the DSP bus. The I/O interface also communicates an I/O interrupt to the DSP bus when the external I/O device is ready for a transfer of samples between the I/O register and the DSP data memory.

In the illustrative embodiment, the audio controller accepts unprocessed samples from three external I/O devices and sends processed samples to three external I/O devices, each operating at a sample frequency of 48 kHz. Typically, conventional audio controllers would thus have to handle approximately 288,000 I/O interrupts per second from the six I/O devices, wherein each I/O interrupt is a request to move two 16-bit words of data between DSP data memory and an I/O register.

Advantageously, the interrupt accelerator handles the 288,000 I/O interrupts, interrupting the DSP only when a predetermined number of samples, such as 32 pairs of stereo audio samples, have been transferred to or from a sample buffer. If all six I/O interfaces are operating, the one DSP interrupt will thus cause the DSP to handle the 32 stereo pairs in each of the six corresponding sample buffers. Consequently, the number of interrupts to the DSP is reduced from 288,000 to approximately 1,500 interrupts per second. However, other manners of transferring samples to various types of I/O devices will be apparent to one of ordinary skill in the art having the benefit of the instant disclosure, and as such, the invention is not limited to this particular implementation.

Figure 1:
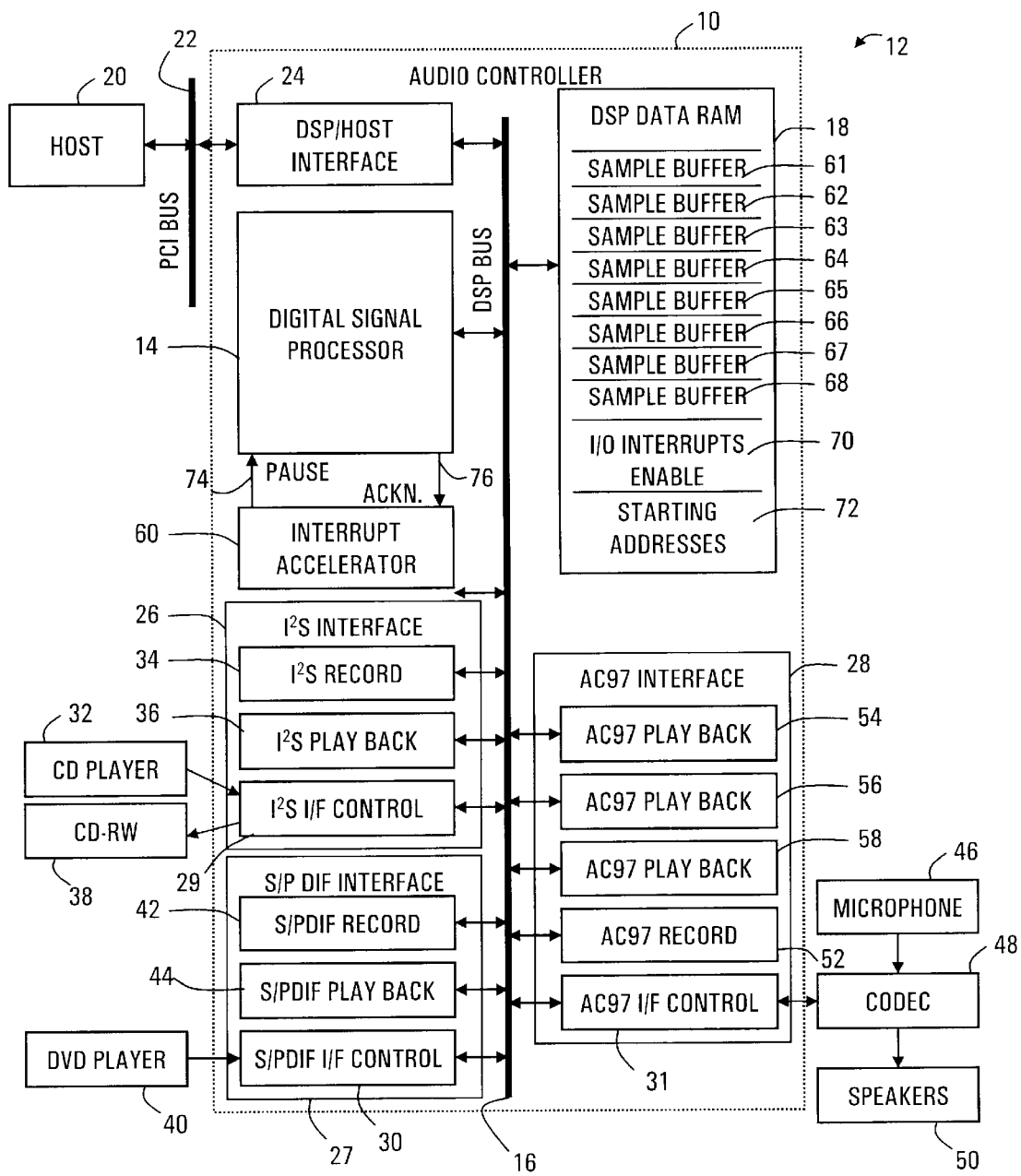
FIG. 1 is a block diagram of a digital signal processor circuit arrangement incorporating an interrupt accelerator consistent with the invention.

Turning to the drawings, wherein like numbers denote like parts throughout the several views, FIG. 1 illustrates a circuit arrangement 10 consistent with the invention. In the illustrated implementation, circuit arrangement 10 is disposed on a single integrated circuit, or chip, as an audio controller for an audio subsystem 12. Circuit arrangement 10 includes a DSP core 14 coupled via a DSP bus 16 to a DSP data random access memory (RAM) 18. The DSP core 14 is based on the PINE™ architecture, licensed by DSP Group of Santa Clara, Calif., which is a programmable 16-bit integer DSP with separate code and data buses (Harvard architecture), depicted and described herein as the DSP bus 16.

It will be apparent to those of ordinary skill in the art having the benefit of the instant disclosure that circuit arrangement 10 may be used in other applications consistent with the invention, including video signal processing, communication data coding/decoding, and practically any other application of DSPs.

An audio controller such as shown in FIG. 1 illustrates a use of DSPs in systems that typically have a number of external I/O devices that provide and require digital signal data samples. A host 20, such as a personal computer CPU, is shown communicating with the audio controller 10 across a PCI (Peripheral Component Interconnect) bus 22 to a DSP/Host interface 24 that in turn resides on the DSP bus 16.

The audio controller 10 includes interfaces for various types of external I/O devices, depicted as an $I^2S$ interface 26, an S/P DIF interface 27, and an AC97 interface 28. Each interface 26–28 is coupled to the DSP bus 16 via a respective interface control 29–31 to transfer samples between the assigned I/O register(s) and the respective external I/O device(s) and to provide an I/O interrupt when samples require transferring between an I/O register and a corresponding sample buffer in the data memory 18.

The $I^2S$ interface 26 receives recording samples from an external I/O device, depicted as a CD (compact disk) player 32. In particular, $I^2S$ interface 26 is comprised of the $I^2S$ interface control 29, an $I^2S$ record register 34 and an $I^2S$ play back register 36. The $I^2S$ interface control 29 receives the samples and moves the samples to the $I^2S$ record register 34. The $I^2S$ interface control 29 also reads processed samples from the $I^2S$ play back register 36 and provides them to another external I/O device, depicted as a CD-RW (compact disk re-writable) recorder 38.

As used herein, the term "record" when associated with samples and registers refers to samples input to the audio controller 10 for signal processing. This convention is used since the unprocessed samples often originate as recorded audio signals that need to be mixed or otherwise altered. It should be appreciated that the record register may contain a sensed signal, such as from a microphone as discussed below, rather than a previously recorded signal. Similarly, the term "play back" when associated with samples and registers refers to samples output from the audio controller after signal processing. However, as also discussed below, the processed samples may ultimately be recorded after being output from a play back register.

The S/P DIF interface 27 receives recording samples from an external I/O device, depicted as a DVD player 40. In particular, S/P DIF interface 27 is comprised of the S/P DIF control 30, an S/P DIF record register 42, and an S/P DIF play back register 44. The S/P DIF control 30 moves the samples to the S/P DIF record register 42 from the DVD player 40. Although not depicted, another external I/O device may also receive processed samples from the S/P DIF interface 27 from the S/P DIF playback register 44, which is also moved by the S/P DIF control 30.

The AC97 interface 28 receives recording samples from an analog external I/O device, depicted as a microphone 46, whose signal is digitized by a CODEC 48. Similarly, the AC97 interface 28 sends processed samples to analog external I/O devices, depicted as speakers 50, via the CODEC 48. In particular, the AC97 interface 28 is comprised of the AC97 interface control 31, an AC97 record register 52, and AC97 play back registers 54–58. The AC97 interface control 31 stores the received samples in the AC97 record register 52. The AC97 interface control 31 also moves processed samples to the CODEC 48 for speakers 50 from the respective AC97 play back registers 54–58.

An interrupt accelerator 60 is configured to receive I/O interrupts and, in response, to associate the I/O interrupt with the appropriate I/O registers, a desired direction of transfer (input or output), and a memory storage location in an appropriate data buffer in data memory 18. More particularly, the interrupt accelerator 60 advantageously transfers recording samples from the record registers 34, 42, 52 to a respective assigned data drum, depicted as sample buffers 61–63. The interrupt accelerator 60 also advantageously transfers processed samples from data drums, depicted as sample buffers 64–68, to respective assigned playback registers 36, 44, 54–58.

When the interrupt accelerator 60 receives an I/O interrupt from an interface 26–28, the interrupt accelerator 60 references an I/O interrupts enable data structure 70 in data memory 18 to see if this I/O interface is enabled by the DSP core 14 and/or the host 20. If enabled, the interrupt accelerator 60 references a data structure 72 for starting addresses of the sample buffers 61–68 to locate the appropriate sample buffer 61–68 for the I/O interface. The interrupt accelerator 60 also pauses the DSP core 14 over a pause line 74. Once the DSP core 14 has accepted the pause signal, a pause acknowledge signal is returned to the interrupt accelerator 60 over an acknowledge line 76. With the DSP core 14 paused, the interrupt accelerator 60 takes control of the DSP bus 16 and transfers the samples, and then removes the pause signal from line 74 to allow the DSP core 14 to continue.

Once the interrupt accelerator 60 has transferred 32 stereo pairs of samples to any of the respective sample buffers 61–63, the interrupt accelerator 60 interrupts the DSP core 14 over the DSP bus 16 so that the DSP may process the samples in the respective sample buffer 61–63. Similarly, once the interrupt accelerator 60 has transferred 32 stereo pairs of samples from any of the respective sample buffers 64–68, the interrupt accelerator 60 interrupts the DSP core 14 over the DSP bus 16 so that the DSP may provide an additional 32 processed samples to the respective sample buffer 64–68.

Pausing rather than interrupting the DSP core 14 results in significant processing advantages. When paused, the DSP core 14 remains in the same state with current values of instruction code and data retained, unlike an interrupt to the DSP that requires that interrupt code be loaded after storing the previous state. Once the interrupt code is executed, then the previous state has to be reloaded. Since the interrupt code for the DSP may include other interfaces such as the DSP/host interface 24, execution of the interrupt code may take a significant amount of operations, such as 30–50 operations or more.

While all of the components of circuit arrangement 10 are illustrated as being integrated onto a single integrated circuit device, or chip, it will be appreciated that any of the components may be disposed on separate integrated circuits electrically coupled to the integrated circuit incorporating the DSP. As such, any of the buses illustrated in FIG. 1 may be implemented using on-chip wiring or via separate transmission lines, utilizing electrical and/or optical media to implement each transmission line.

Moreover, as it is well known in the art, integrated circuit devices are typically designed and fabricated using one or more computer data files, referred to herein as hardware definition programs, that define at various levels of detail the functionality and/or layout of the circuit arrangements on the devices. The programs are typically generated by a design tool and are subsequently used for simulation and/or during manufacturing to create the layout masks that define the circuit arrangements applied to a semiconductor wafer. Typically, the programs are provided in a predefined format using a hardware definition language (HDL) such as VHDL, Verilog, EDIF, etc. While the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of signal bearing media being used to actually carry out the distribution. Examples of signal bearing media include, but are not limited to, recordable type media such as volatile and nonvolatile memory devices, floppy disks, hard disk drives, CD-ROMs, and DVDs (among others), and transmission type media such as digital and analog communication links.

Figure 2:
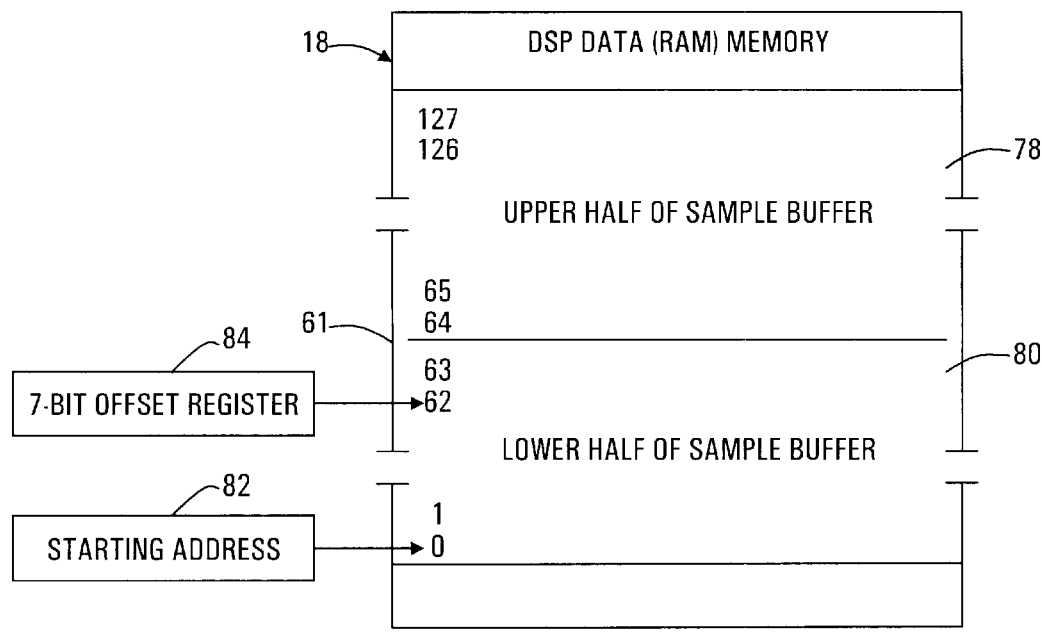
FIG. 2 is a block diagram of a data structure for a sample buffer, illustrating storing samples in conjunction with signal processing by the circuit arrangement.

FIG. 2 next illustrates a data structure for one of the sample buffers 61 in DSP data RAM 18. In order to prevent conflicts between the DSP core 14 and the interrupt accelerator 60, the sample buffer 61 is split into an upper half 78 and a lower half 80, each having 6416-bit words of sample storage (i.e., 32 stereo pairs of data). The interrupt accelerator 60 locates the specific sample buffer 61 by referencing a starting address 82 stored in the data structure 72 (not depicted in FIG. 2). The interrupt accelerator 60 locates the next word in sample buffer 61 by referencing a 7-bit offset register 84. The DSP core 14 is also able to determine which half 78, 80 to access based on the 7-bit offset register 84.

It will be appreciated that the drum buffer, depicted as sample buffer 61 of FIG. 2, is illustrative and that other types of data structures may be used, as would be apparent to one of ordinary skill in the art having the benefit of the instant disclosure. For example, a fixed sample buffer 61 of 128 words may be replaced with buffers of a size dynamically allocated. As another example, fixed size sample buffers may be used of a smaller or larger size depending upon an acceptable time delay and the processing characteristics of the DSP core 14.

Figure 3:
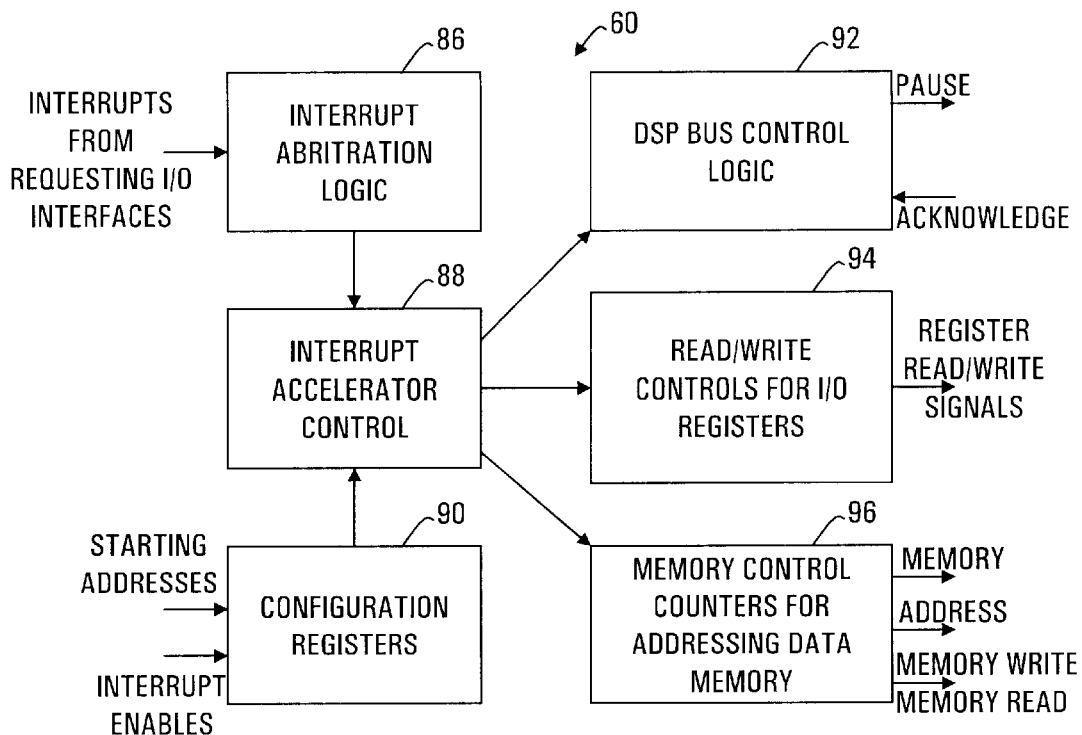
FIG. 3 is a block diagram of the interrupt accelerator of FIG. 1.

FIG. 3 next illustrates a specific implementation of the interrupt accelerator 60. An interrupt arbitration logic circuit 86 responds to I/O interrupts from the I/O interfaces 26–28 by sequencing each I/O interrupt to an interrupt accelerator controller 88. In response thereto, the controller 88 references configuration registers 90 that are set with starting addresses of the buffers 61–68 and I/O interrupt enable settings by the DSP core 14 and/or the host 20. The controller 88 activates a DSP bus control logic circuit 92 to send a pause signal to the DSP core 14 and to await an acknowledge signal from the DSP core 14 when paused. Thereafter, the interrupt accelerator controller 88 activates read/write controls circuit 94 for reading or writing, as appropriate, to the corresponding I/O register. The controller 88 also activates one of a plurality of memory control counters 96, each added to the corresponding starting address for the sample buffer to write to or read from as appropriate the appropriate point in the data memory 18.

It will be apparent to one of ordinary skill in the art having the benefit of the instant disclosure that the functions described for FIG. 3 may be readily achieved with approximately 5000 logic gates, which is a relatively small amount compared to the overall size of the circuit arrangement 10 of approximately 250,000 logic gates.

Figure 4:
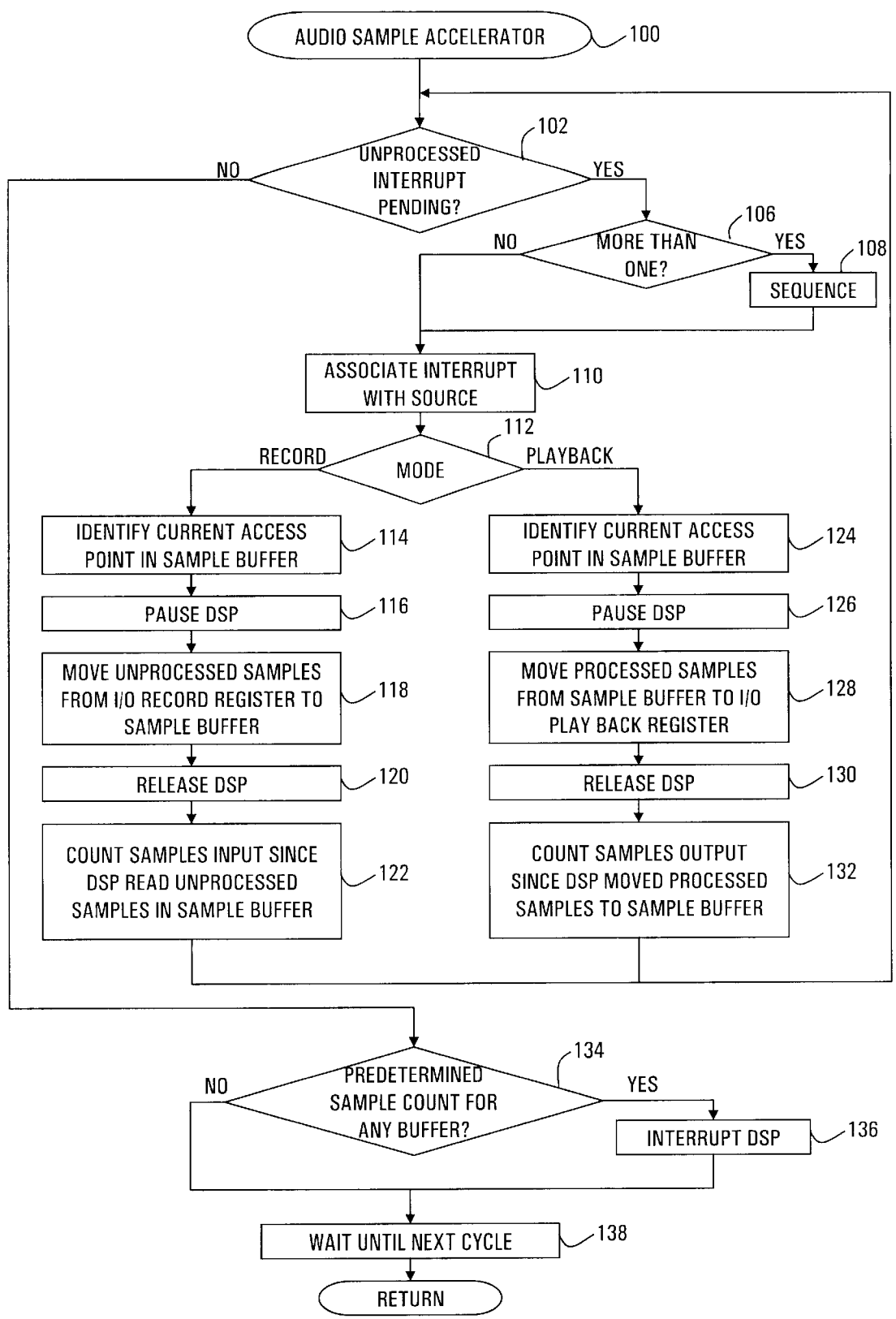
FIG. 4 is a flowchart illustrating an audio sample accelerator algorithm utilized by the circuit arrangement of FIG. 1.

FIG. 4 illustrates the operation of the interrupt accelerator 60 shown in FIG. 3 consistent with the invention. In particular, an audio sample accelerator routine or algorithm 100 is illustrated beginning at block 102 wherein a determination is made as to whether one or more unprocessed I/O interrupts are pending. This determination includes situations where two or more I/O interrupts are received simultaneously as well as when multiple I/O interrupts have previously been sequenced and one or more remain.

If in block 102 a new or previously sequenced interrupt has been detected, then a further determination is made as to whether more than one new I/O interrupt has been received (block 106) and, if so, they are sequenced (block 108). If already sequenced in block 106 or after sequencing in block 108, then the I/O interrupt being handled is associated with the source (block 110), e.g., I/O interface, read or write channel of the I/O interface, I/O register, and sample buffer of the data memory.

The association is used in block 112 to determine whether a record mode is indicated, wherein unprocessed samples are to be transferred into memory or whether a play back mode is indicated wherein processed samples are to be transferred out of memory. If record mode is determined in block 112, then the current access point in the assigned sample buffer is referenced (block 114). The DSP is paused which, in the illustrative implementation, includes a pause signal to the DSP followed by a waiting until the DSP acknowledges being paused (block 116). Acknowledging the pause advantageously allows the DSP to complete certain tasks before accepting the interrupt. Then, the unprocessed samples are moved from the I/O record register to the sample buffer (block 118). Once transferred, the pause signal is removed, releasing the DSP (block 120). The tracking of samples transferred to the sample buffer is counted (block 122). This tracking may entail incrementing the offset counter to the next memory address. After block 122, control returns to block 102 to handle any other I/O interrupts from other external I/O devices.

Similarly, if in block 112 play back mode is indicated, then the current access point in the assigned sample buffer is referenced (block 124). The DSP is paused (block 126). Then, the processed samples are moved from the sample buffer to the I/O record register (block 128). Once transferred, the pause signal is removed, releasing the DSP (block 130). The tracking of samples transferred from the sample buffer is counted (block 132). This tracking may entail incrementing the offset counter to the next memory address. After block 132, control returns to block 102 to handle any other I/O interrupts from other external I/O devices.

If in block 102 a determination is made that no further I/O interrupts remain to be processed, then control proceeds to block 134. In block 134, a determination is made as to whether a block of samples has been transferred into or from any of the sample buffers since the last DSP interrupt. In particular, the determination is made whether a predetermined sample count has been transferred. For example, the offset counter for the sample buffer may be referenced to see if it has been incremented to the other half of the sample buffer. The 7-bit offset counter would automatically roll over to the start of the other half of the sample buffer since the illustrative sample buffer has 128 addresses. If half of the sample buffer (e.g., 32 or more pairs) has been become available for the DSP, then the DSP is interrupted (block 136) and routine 100 waits until the next cycle to handle additional I/O interrupts (block 138).

In use, the interrupt accelerator 60 responds to I/O interrupts from I/O interfaces 26–28 by pausing the digital signal processor 14 and transferring samples between the corresponding I/O register 34, 36, 42, 44, 52–58 and sample buffer 61–68 in data memory 18. When half 78, 80 of any of the sample buffers 61–68 have been transferred, the interrupt accelerator 60 interrupts the digital signal processor 14 so that the half 78, 80 may be used. In so doing, the digital signal processor 14 has less processing overhead associated with I/O devices and can thus perform additional signal processing operations.

Various modifications may be made to the illustrated embodiments without departing from the spirit and scope of the invention. For example, audio subsystem 12 may include different numbers or types of external I/O devices. In particular, samples such as MIDI samples may originate from the host and be transferred by the interrupt accelerator 60 to play back registers without any input from record registers. Similarly, the interrupt accelerator 60 may transfer samples from record registers without any output to play back registers. Also, implementation in audio processing is merely exemplary, as an interrupt accelerator can be used in any other DSP application to minimize interrupts to a DSP due to data transfer with external I/O devices.

Other modifications will be apparent to one of ordinary skill in the art having the benefit of the instant disclosure. Therefore, the invention lies in the claims hereinafter appended.

What is claimed is:

1. A circuit arrangement for use in executing a digital signal processor (DSP) program to process digital signal data, the circuit arrangement comprising:

a data memory configured to store digital signal data comprised of samples;

a DSP coupled to the data memory and configured to process samples stored in the data memory;

an I/O interface configured to generate an I/Ointerrupt; and an interrupt accelerator configured to detect the I/O interrupt from the I/O interface, to transfer a sample between the I/O interface and the data memory in response thereto, and to interrupt the DSP after a predetermined number of samples are transferred between the I/O interface and the data memory.

2. An integrated circuit device comprising the circuit arrangement of claim 1.

3. A signal processing system comprising the circuit arrangement of claim 1.

4. A program product, comprising a hardware definition program that defines the circuit arrangement of claim 1, and a signal bearing media bearing the hardware definition program.

5. The program product of claim 4, wherein the signal bearing media includes at least one of a transmission type media and a recordable media.

6. A circuit arrangement for use in executing a digital signal processor (DSP) program to process digital signal data, the circuit arrangement comprising:

a data memory configured to store digital signal data comprised of samples;

a DSP coupled to the data memory and configured to process samples stored in the data memory;

an I/O interface configured to generate an I/O interrupt: and an interrupt accelerator configured to detect the I/O interrupt from the I/O interface, to transfer a sample between the I/O interface and the data memory in response thereto, and to interrupt the DSP after a predetermined number of samples are transferred between the I/O interface and the data memory;

wherein the I/O interface further comprises an I/O register, wherein the I/O interface is configured to transfer samples between an external I/O device and the I/O register, and wherein the interrupt accelerator is configured to transfer samples between the I/O interface and the data memory by transferring samples between the I/O register and the data memory.

7. The circuit arrangement of claim 6, wherein the interrupt accelerator is configured to associate the I/O interrupt with the I/O register, a transfer direction, and a memory location in a sample buffer in the data memory responsive to the I/O interrupt.

8. The circuit arrangement of claim 7, further comprising a plurality of I/O registers, wherein the interrupt accelerator is further configured to arbitrate between a plurality of I/O interrupts from the plurality of I/O interfaces by sequencing transfers of samples.

9. The circuit arrangement of claim 7, further comprising an I/O interrupt enable data structure, the interrupt accelerator further configured to selectively respond to the I/O interrupt based upon data stored in the I/O interrupt enable data structure.

10. The circuit arrangement of claim 7, further comprising a data structure storing a starting address of the sample buffer, the interrupt accelerator further configured to identify the current location in the sample buffer by tracking an offset from the starting address.

11. The circuit arrangement of claim 7, wherein the DSP is configured to respond to a pause signal by pausing operation and by providing a pause acknowledge signal, the interrupt accelerator further configured to provide the pause signal in response to the I/O interrupt, and to transfer samples in response to the pause acknowledge signal.

12. The circuit arrangement of claim 6, wherein the I/O interface is selected from the group consisting of an inter-IC-sound (I2S) interface, a Sony/Philips digital interface (S/PDIF) and an audio codec '97 (AC97) interface.

13. A circuit arrangement for digital signal processing of audio samples, the circuit arrangement comprising:
    a data memory configured to store digital signal data comprised of audio samples;
    a digital signal processor (DSP) coupled to the data memory and configured to process audio samples stored in the memory;
    an input interface configured to generate I/O interrupts;
    an output interface configured to generate I/O interrupts; and
    an interrupt accelerator configured to transfer audio samples from the input interface to the data memory in response to an I/O interrupt from the input interface, to transfer audio samples from the data memory to the output interface in response to an I/O interrupt from the output interface, and to interrupt the DSP after a predetermined number of audio samples are either transferred from the input interface to the data memory or from the data memory to the output interface.

14. A method of transferring samples between a data memory and an I/O interface, a digital signal processor (DSP) accessing the data memory for processing the samples, the method comprising:
    detecting an I/O interrupt from the I/O interface;
    transferring samples between the I/O interface and the data memory in response thereto; and
    interrupting the DSP after a predetermined number of samples are transferred between the I/O interface and the data memory.

15. The method of claim 14, wherein detecting the I/O interrupt from the I/O interface further comprises:
    detecting an I/O interrupt from one of a plurality of I/O interfaces;
    associating the I/O interrupt with the one I/O interface; and
    transferring samples between the one I/O interface and the data memory.

16. The method of claim 14, further comprising:
    pausing the DSP while transferring samples between the I/O interface and the data memory.

17. The method of claim 16, wherein detecting the I/O interrupt from the I/O interface further comprises:
    detecting an I/O interrupt from one of a plurality of I/O interfaces;
    associating the I/O interrupt with the one I/O interface; and
    transferring samples between the one I/O interface and the data memory.

18. The method of claim 17, wherein detecting an I/O interrupt from one of the plurality of I/O interfaces further comprises:
    detecting concurrent first and second I/O interrupts from the plurality of I/O interfaces;
    sequencing the I/O interrupts for handling one at a time; and
    releasing the digital signal processor after all of the concurrent I/O interrupts have been handled.

19. A method of transferring samples between a data memory and an I/O interface, a digital signal processor (DSP) accessing the data memory for processing the samples, the method comprising:
    detecting an I/O interrupt from the I/O interface;
    transferring samples between the I/O interface and the data memory in response thereto; and
    interrupting the DSP after a predetermined number of samples are transferred between the I/O interface and the data memory;
    wherein detecting the I/O interrupt from the I/O interface further comprises:
        detecting an I/O interrupt from one of a plurality of I/O interfaces;
        associating the I/O interrupt with the one I/O interface; and
        transferring samples between the one I/O interface and the data memory;
    wherein transferring samples between the one I/O interface and the data memory further comprises:
        associating the I/O interrupt with a data buffer in the data memory, the data buffer corresponding to the one I/O interface.

20. The method of claim 19, wherein associating the I/O interrupt with the data buffer further comprises:
    identifying a starting address associated with the data buffer; and
    tracking a current location in the data buffer as an offset from the starting address.

21. The method of claim 19, further comprising:
    determining that a predetermined number of samples have been transferred by detecting a current location in the data buffer switching from one half to another half of a data buffer.

* * * * *